Feb. 2, 1965   R. M. JAMISON   3,168,596
GAS WASHING SYSTEMS PROVIDING HIGH VELOCITY SPRAY
PATTERN OF LIQUID DROPLETS
Filed Jan. 5, 1961

INVENTOR.
Robert M. Jamison

INVENTOR.
Robert M. Jamison
BY
Curtis, Morris, & Safford
ATTORNEYS

INVENTOR.
Robert M. Jamison

United States Patent Office 3,168,596
Patented Feb. 2, 1965

3,168,596
GAS WASHING SYSTEMS PROVIDING HIGH VELOCITY SPRAY PATTERN OF LIQUID DROPLETS
Robert M. Jamison, Detroit, Mich., assignor to Ajem Laboratories, Incorporated, Livonia, Mich.
Filed Jan. 5, 1961, Ser. No. 80,822
8 Claims. (Cl. 261—29)

This invention relates to gas washing systems and, more particularly, to gas washing systems providing a high velocity spray pattern of droplets adapted for wet-type dust and fume collectors and gas-liquid reaction processes.

The present invention is well adapted for use in wet-type dust and fume collectors, often called "air washers," of the type presently in commercial use. The novel gas washing systems in accordance with the principles of this invention as hereinafter described are, for example, adapted for use in collectors of the type shown in the Emil Umbricht Patent 2,789,866, issued April 23, 1957, and, also, the Emil Umbricht et al. Patent 2,833,417, issued on May 6, 1958. However, as will be understood by those skilled in the art, this invention provides numerous advantages which make possible its useful application in apparatus generally of the type requiring for effective operation a highly concentrated, uniformly distributed spray pattern of high velocity droplets.

"Air washers" are employed extensively in industry for the control of air pollution and/or the salvaging of valuable materials, e.g. metal particles, chemicals in both solid, liquid and gas phase, etc. In such apparatus, spray-generating equipment has been employed to generate a spray pattern of droplets for sweeping out and removing air pollutants or other air-borne products, for example, grinding dusts, smoke originating from metallurgical processes, chemical fumes, etc. The contaminated air is directed through a washing spray which, in effect, wets and sweeps out the contaminating material. The washing liquid customarily used for such purposes is water or water with one or more neutralizing agents added thereto to assist not only in the removal of the particulate matter but, also, to facilitate the subsequent handling of the washing liquid. The contaminating material is thereafter separated and recovered from the washing fluid by conventional settling or filtering processes.

The smaller physical species of air-borne contaminants are more difficult to wet and sweep from the air than are ordinary lint and dust particles, and it is found that these smaller particles often pass through spray patterns provided by present-day spray-generating equipment. Such small specie, including, for example, finely divided particles, aerosols, molecular contaminants, etc., require for their removal a highly concentrated uniform spray pattern of very high velocity droplets. Though earlier wet-type collectors have been used widely in air pollution control and the salvaging of air-borne materials, the efficiencies of such collectors with respect to these smaller contaminants is often found to be limited. However, the apparatus embodying the principles of this invention creates a highly concentrated, uniformly distributed spray pattern comprising numerous small droplets of very high velocity which penetrate deeply into the air being washed whereby the probability of collision with these smaller contaminants is increased.

An object of this invention is, therefore, to provide gas washing systems producing a more uniformly distributed, highly concentrated washing spray pattern, i.e. having no voids or irregularities, of very high velocity droplets.

Another object of this invention is to provide gas washing systems incorporating efficient spray-generating equipment which is economical to construct and operate and yet is adapted for rotation at high speeds.

Another object of this invention is to provide gas washing systems which may be effectively incorporated with "air washers" of the type presently in commercial use.

Yet another object of this invention is to provide gas washing systems wherein the spray-generating apparatus is not subject to deforming stresses from residues or other unbalancing conditions while rotating at high speeds.

These and other objects of this invention are achieved and numerous advantages are provided in the illustrative gas washing systems embodying this invention wherein the spray-generating equipment comprises a multiplicity of impeller vanes arranged in a balanced pattern about the axis of a rotating support plate. The washing liquid is fed to the impeller vanes from a feed device near the axis of rotation of the support plate. Accordingly, the washing liquid due to rapid revolutions of the support plate, is centrifugally accelerated outwardly along each of the impeller vanes. Having traveled along the impeller vanes, the washing liquid is impelled as from a sling by the vanes in the form of droplets. By this method, high velocity droplets are produced for a more thorough cleaning of air contaminants. The high speed revolutions of the support plate result in a corresponding decrease in the size of the droplets and, also, a corresponding increase in the energy imparted thereto for a more effective scrubbing of the air. Further, as the impeller vanes are equiangularly disposed about the axis of rotation of the support plate, the air in passing through the spray pattern is swept by rotating ray-like streams of high velocity droplets emanating about the periphery of the support plate. The spray generator thus provided is of rugged construction and not subject to deforming stresses when operated at very high speeds.

Another advantage of the illustrative examples of this invention results from the provision of a multiplicity of spray-generating units keyed to a single drive shaft to effect a staggered or offset relationship of the respective impeller vane patterns. In addition, impeller vane patterns are provided in staggered relationship on lower and upper surfaces of each support plate. In effect, therefore, the contaminated gas is directed through a spray pattern comprising overlapping layers of diverse patterns of high velocity droplets. (See FIGURE 3, for example.) Impeller vanes of differing curvature are provided on the lower and upper surfaces of the rotating support plates whereby the respective patterns of droplets generated differ with respect to initial origin, direction and, also, velocity. Therefore, the possibility of voids or interstices in the resultant spray pattern of high velocity droplets so developed is very substantially reduced.

Yet another advantage of the illustrative embodiments of this invention results from the provision of an improved feed device for supplying washing liquid to the respective vane patterns mounted on the support plates. These feed devices are arranged so that the washing liquid is supplied to the surface of each support plate uniformly about its axis of rotation. Accordingly, there is a more uniform distribution of the washing liquid on the surfaces of the support plates which, in turn, assures the generation of an even and well-distributed droplet pattern. In addition, a feed device of novel type is positioned intermediate adjacent support plates along the drive shaft. The feed device so positioned is operative concurrently to swirl the washing liquid and to supply it in the manner described to the spatially opposed surfaces of these support plates and into the vane patterns provided to each.

The foregoing and other objects and features of this invention will become apparent upon a consideration of the following detailed description when taken in conjunction with the accompanying drawings wherein:

FIGURE 1A illustrates an optional method of directing washing fluid upward and onto the lower portion of the spray generator illustrated in FIGURE 1.

Figure 1:
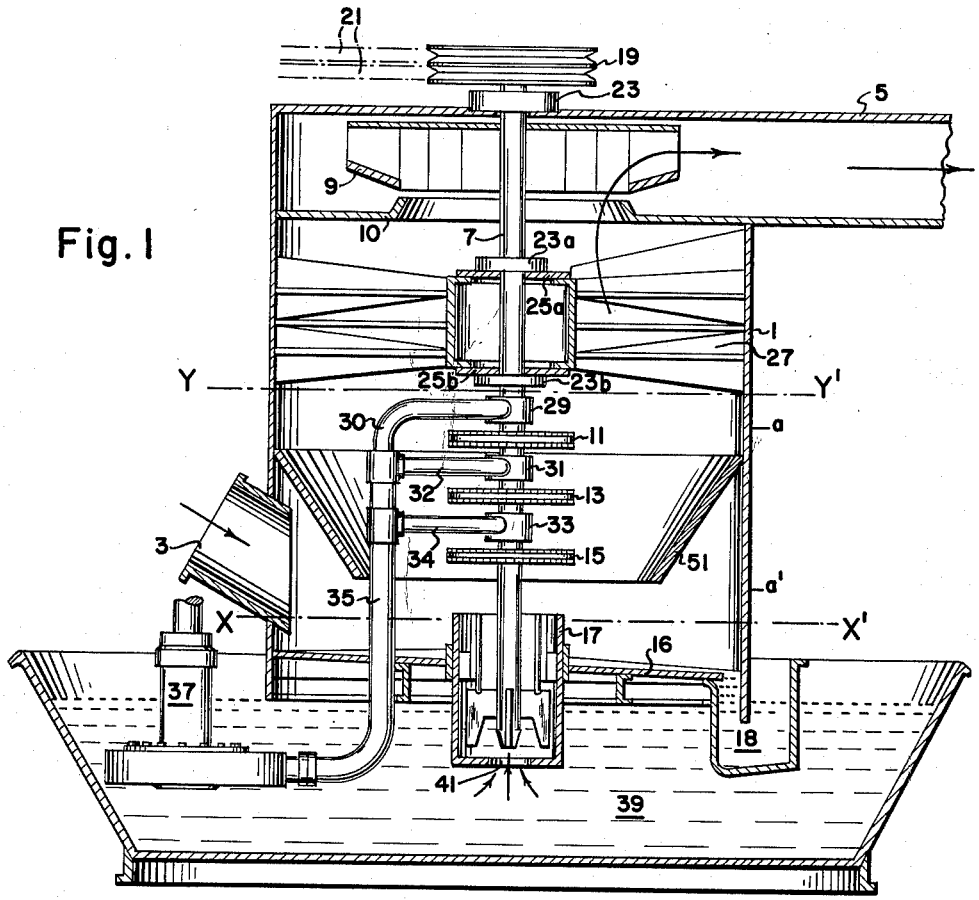
FIGURE 1 is a vertical, axial sectional view of an "air-washer" or wet-type collector embodying the spray-generating equipment of this invention.

As shown in FIGURE 1, the wet-type collector apparatus incorporating the principles of this invention includes an upright substantially cylindrical casing 1 having an input duct 3 for directing contaminated gas, for example, contaminated air, into the apparatus and an output duct 5 for directing the subsequently washed gas, i.e. cleaned of contaminants, from the apparatus.

A rotating shaft 7, mounted coaxially in the casing 1, supports an impeller fan 9, the spray-generating equipment comprising the spray-generating units 11, 13 and 15 and a washing liquid pump 17. The rotating shaft 7 is connected at the top exterior of the casing 1 to a sheave 19 which is driven by a motor, not shown, by means of the V-belts 21. The impeller fan 9, aligned with the output duct 5, is mounted on the shaft 7 at the top interior of the casing 1, and the washed gas to be discharged is drawn up through the throat of an output baffle 10. The shaft 7 is suitably supported for rotation by bearings such as those indicated at 23, 23a and 23b. The bearings 23a and 23b rest upon upper and lower plates 25a and 25b, respectively, forming part of a moisture-eliminating baffle system 27. This baffle system 27 comprises a number of stationary deflectors providing a tortuous path for the upward traveling air. The baffle system 27 is of conventional design and effects the removal of minute water particles which may be carried upward by the washed air directed from the scrubbing area.

Figure 2A:
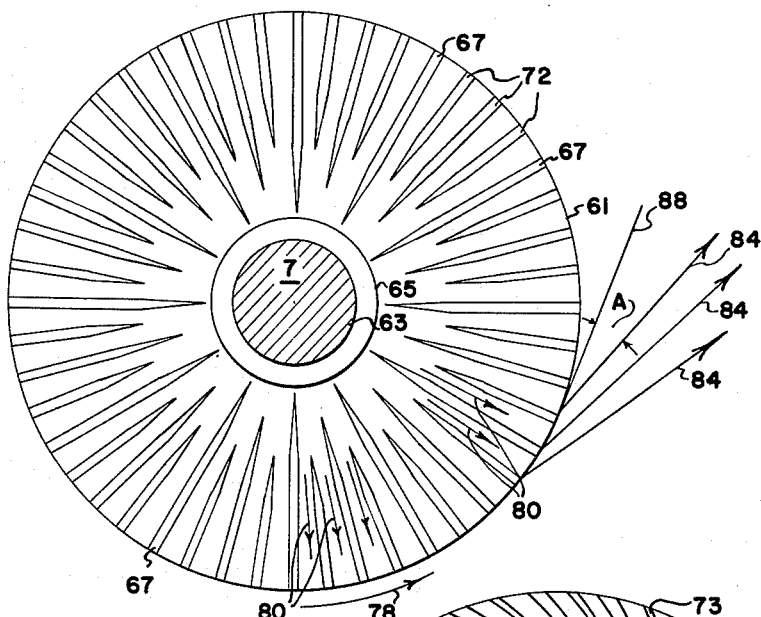
FIGURES 2A and 2B illustrate certain advantageous impeller vane patterns which are provided on the rotating support plates of the spray generator illustrated in FIGURE 1. More particularly, FIGURE 2A and 2B, respectively, show impeller vane patterns having radial vanes and vanes of predetermined curvature in the direction of rotation of the support plate, respectively.
Figure 2B:
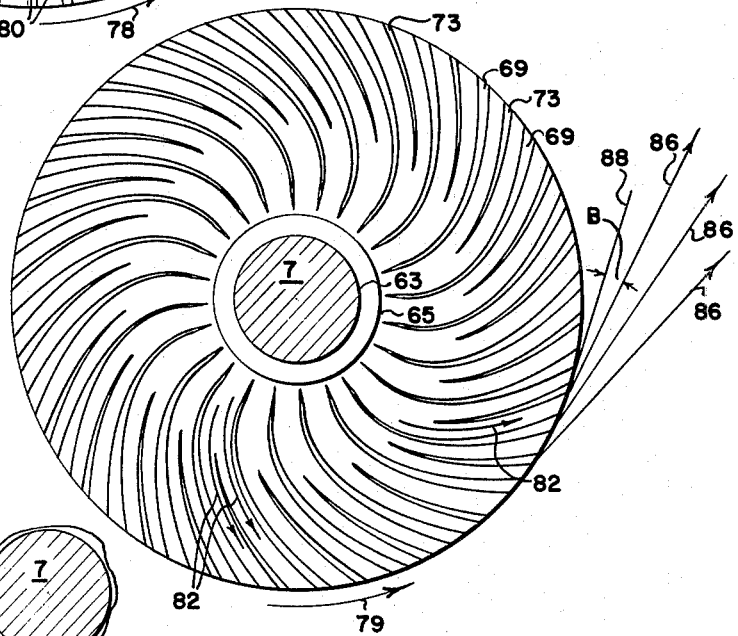
Figure 3:
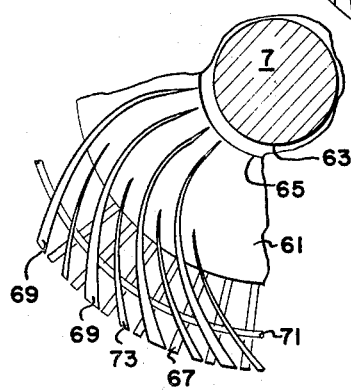
FIGURE 3 is a sectorial view illustrating a variation in the structure of the support plate on which impeller vane patterns are mounted.
Figure 2C:
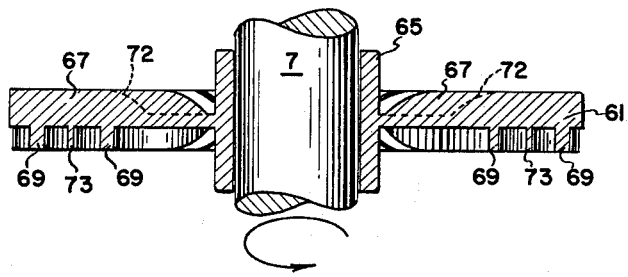
FIGURE 2C shows an axial of impeller vanes of FIGURE 1 mounted on opposite surfaces of a support plate.

The scrubbing area of the air-washing apparatus is situated below the baffle system 27 and is indicated in FIGURE 1 as the longitudinal segment a–a′ of the casing 1. The spray-generating equipment which comprises the units 11, 13 and 15 is located within the scrubbing area a–a′. As hereinafter further described, each of the units 11, 13 and 15 includes a plurality of impeller vanes arranged in predetermined upper and lower patterns, for example, as illustrated in FIGURES 2A and 2B. Positioned above the unit 11 and also positioned between the pairs of units 11 and 13 and 13 and 15 are cylindrical feed device housings 29, 31 and 33, respectively. The feed device housings 29, 31 and 33 are supported in coaxial alignment about the shaft 7. By virtue of the particular structure of the feed device housings 29, 31 and 33, more particularly shown in FIGURES 4A and 4B and hereinafter further described, the washing liquid is directed to the spatially opposing faces of the spray-generating units 11, 13 and 15, respectively, and uniformly distributed about the shaft 7. Moreover, the washing liquid is swirled in the direction of rotation of the shaft 7 whereby a maximum amount of the washing liquid finds its way into the respective vane patterns mounted on the units 11, 13 and 15.

The washing liquid to be generated into a spray pattern is directed under pressure in predetermined proportions to the feed device housings 29, 31 and 33 by a pipe arrangement 35 supplied by a pressure pump 37. The pipe arrangement 35 is connected through the agency of T-couplers and the supply pipes 30, 32 and 34 of predetermined relative capacities to the feed device housings 29, 31 and 33, respectively. The pipe arrangement 35 also serves to support the feed device housings 29, 31 and 33 fixed in position about the rotating shaft 7. The pressure pump 37 is immersed in a reservoir 39 situated below an inclined shed 16 of the casing 1. The shed 16 is connected to the reservoir 39 through a recirculation trough 18. The washing liquid and the wet contaminants which are removed from the upwardly flowing air run down the inner wall of casing 1 and, also, fall down against the upwardly flowing air onto the shed 16 and are directed into the trough 18. The trough 18 may include, for example, filtering apparatus, not shown, of the type shown in the above-mentioned Emil Umbricht Patent 2,833,417 for removing such contaminants from the washing fluid. The filtered washing liquid is thereupon returned to the reservoir 39 to be recirculated.

As illustrated in FIGURE 1, a corresponding feed device housing is not provided for the lower face of the spray-generating unit 15. Rather, a liquid pump 17, which is conventional, is shown for supplying washing liquid from the reservoir 39 to the lower face of the unit 15. As illustrated, the housing of the liquid pump 17 extends through the shed 16 of the casing 1 and into the reservoir 39. In opening 41 is provided in the base of the housing of liquid pump 17 through which the washing liquid enters from the reservoir 39. Impeller blades of the liquid pump 17 are mounted on the rotating shaft 7 and are operative to throw the washing liquid upwardly and onto the lower face of the unit 15. Further description of the liquid pump 17 may be had by reference to U.S. Patent No. 2,599,202.

Figure 1A:
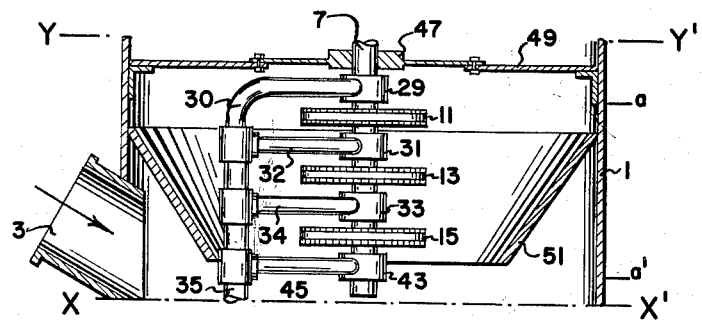
FIGURE 1A is a partial axial sectional view of an air-washer generally similar to that of FIGURE 1 and showing another embodiment of the invention. More particularly.

However, and if desired, a feed device housing 43 of novel type can be provided to supply washing liquid to the lower face of the unit 15 as shown in FIGURE 1A. In this event, an additional supply pipe 45 is connected through a T-coupler to the pipe arrangement 35; also, the shed 16 is made continuous to the trough 18. The rotating shaft 7a can, therefore, be terminated at a level slightly beneath the housing 43. However, to maintain the rotating shaft properly positioned, an additional bearing 47 may be provided above the feed device housing 29, also shown in FIGURE 1A. The additional bearing 47 is supported by a pair of braces 49 which extend from the walls of the casing 1. Among the benefits to be derived by the use of the arrangement shown in 1A, i.e. the rotating shaft 7a being cantilevered above the scrubbing area, are those resulting from the fact that the bearing or friction points are not exposed to corrosive gases which may be contained in the contaminated air.

An annular baffle 51 is located within the scrubbing area a–a′ and is positioned concentrically about the rotating shaft 7. The baffle 51 extends from the inner wall of the casing 1. The contaminating air entering from the input duct 3 is distributed by the baffle 51 to pass through the scrubbing area a–a′ about the peripheries of the spray-generating units 11, 13 and 15.

During operation, the shaft 7 rotates each of the units 11, 13 and 15 and, also, operates the impeller fan 9 and the liquid pump 17. Concurrently, the pressure pump 37 feeds washing liquid under pressure through the pipe arrangement 35 to the housings 29, 31 and 33. The impeller fan 9 sucks in contaminated air through the input duct 3, and the air is distributed about the baffle 51 and passes upwardly through the scrubbing area a–a′.

The contaminated air is thus forced to pass upwardly through a high-speed, uniform spray developed by combined actions of the respective vane patterns of the rotating units 11, 13 and 15. This high-speed, uniform spray is comprised of thin layers of high velocity droplets impelled from the respective upper and lower vane patterns of each of the units 11, 13 and 15. As hereafter to be described, the respective layers of droplets overlap and are diversely oriented with respect to their initial origins, directions and velocities. The result is a concentrated, uniformly distributed spray pattern of very high efficiency. Accordingly, the contaminated air passing through the spray pattern is subjected to a washing, i.e. bombardment, by fast-moving droplets. The air, after being washed, is directed upwardly through the baffle system 27 to remove any moisture contained therein and is discharged through the output 5. It is found that this air-washing system is very effective in removing even the most minute contaminants. The washing liquid together with the contaminants collected therein falls onto the shed 16 and is returned through the trough 18 to the reservoir 39.

To fully understand the operation of the spray generator in accordance with the principles of this invention, reference is now had to FIGURES 2A to 2C. FIGURES 2A and 2B, respectively, represent opposite faces of one of the spray-generating units 11, 13 or 15. Each unit includes a support plate 61 shown here as circular in the form of a slinger disc made of steel or stainless steel or similar material, depending upon the corrosion characteristics of the gas and its contaminants. The support plate 61 has a central opening 63 and is provided with an integral coaxial hub 65 fixedly secured to the shaft 7, e.g. by set screw, keying pin, etc. Extending outwardly from the hub 65 and on each face of the slinger disc 61 is a plurality of impeller vanes of predetermined curvature. For example, in FIGURE 2A, the impeller vanes 67 are shown as being substantial radial, i.e. having an infinite radius of curvature; in FIGURE 2B, the impeller vanes 69 are shown as having a finite radius of curvature. The outer ends of the respective impeller vanes terminate flush with the periphery of the slinger disc 61. In certain applications the radius of the slinger disc 61 may be reduced with respect to the diameter of the impeller vane patterns so that the ends of the vanes 67 and 69 extend beyond the periphery of the disc as shown in FIGURE 3. In this event, a strengthening ring 71 may be provided to support the outer ends of the vanes.

To increase the efficiency of the spray generator of this invention by providing a more uniform distribution of the spray, a large number of impeller vanes is preferred in each vane pattern. Accordingly, the number of impeller vanes is effectively increased by positioning one or more vanes 72 and 73 between the vanes 67 and 69, respectively. The inner ends of the vanes are tapered, as shown in FIGURES 2A and 2B, so as to provide a large clearance space to accommodate the outward acceleration of large volumes of the liquid. Accordingly, the concentration of the high velocity droplets comprising the individual layers of the spray pattern developed is increased with a corresponding increased gas-washing efficiency.

In the practice of this invention, the vanes mounted on the respective faces of the rotating spray-generating units 11, 13 and 15 are of differing angular position and of differing curvatures so as to produce the desierd uniformity in distribution of the high velocity droplets. Also, the individual vanes on the top and bottom of each slinger disc, e.g. the disc 61, are staggered whereby the origin and direction of the high velocity droplets is different for each layer of the spray pattern. Moreover, the individual spray-generating units 11, 13 and 15 of FIGURE 1 are keyed to the shaft 7 at progressively different angular settings so that the individual vane patterns are staggered with respect to those of the other units.

By virtue of the strength of the units 11, 13 and 15 and the balanced structure of the individual vane patterns, these units are adapted to be rotated at very high speeds while maintaining a symmetry of force distribution about the shaft 7. Further, the spray-generating units 11, 13 and 15 are not subject to deforming stresses as each comprises a solid unitary structure extending in a plane perpendicular to the shaft. As illustrated in FIGURE 2C, the inner ends of each of the impeller vanes comprising the individual patterns are tapered to points. Accordingly, fibrous materials and other like residues are prevented from hanging onto the individual vanes and thus are prevented from unbalancing the high speed units 11, 13 and 15. In addition, the washing liquid which is accelerated along the surface of the slinger disc 61 and between the impeller vanes disposed thereon effects a scrubbing action which further prevents the formation of residues.

The rapidly rotating vane patterns are operative to transform the washing liquid supplied thereto into high velocity droplets. The washing liquid, in each instance, is directed by the feed device housings 29, 31 and 33 to the upper and lower faces of the rotating units 11, 13 and 15 of FIGURE 1 about the shaft 7 and is accelerated outwardly along the respective surfaces between the individual vane patterns disposed thereon. In addition to the other advantages, the tapering of the impeller vanes and the alternating of longer and shorter vanes as shown in FIGURES 2A and 2B allows for accommodation of a larger amount of the washing liquid on the surfaces of the discs 61. The reason for this advantageous arrangement is that a large number of impeller vanes in a particular pattern is preferred at the periphery of the annular support plate 61; but if all of them extended to the center, the ends of these impeller vanes in close proximity to the hub 65 would become crowded, and accordingly, less of the washing liquid would find its way to the surface of the disc 61, and a large portion of the washing liquid, on being supplied to the surface of a particular spray-generating unit, would be deflected and not caught on the forward face of the individual vanes. The alternating of the longer and shorter vanes 67 and 72 and 69 and 73 and, also, the tapering of the vanes, as illustrated, is accordingly advantageous. Therefore, the washing liquid in large volume feeds to the surface of the rotating disc 61 and is accelerated out by the respective vane patterns as from a liquid pool. In addition, any portion of the washing liquid which may be deflected upwardly or downwardly from one of the units 11, 13 or 15 engages one of the neighboring units and is flung outwardly so as to participate in the creation of the washing spray.

Due to the very high speed of rotation as indicated by the curved arrows 78 and 79 in FIGURES 2A and 2B, the washing fluid directed to the respective surfaces of the support plates 11, 13 and 15 flows into the respective vane patterns and is centrifugally accelerated along the faces of the individual vanes as indicated by the arrows 80 and 82. As the washing liquid travels outwardly along the forward faces of the individual vanes 67 and 72 and 69 and 73 as a layer it continues to accelerate. At the outer end of each individual vane, the washing liquid is effectively broken up into tiny droplets which are hurled outwardly at high velocity in the direction shown by the arrows 84 and 86.

Thus, the total spray developed by all the vaned impellers is, in effect, a "stack" of layers of high velocity droplets, the droplets of each layer emanating from a particular impeller. With respect to the radial vanes 67 and 72 shown in FIGURE 2A, the individual droplets are impelled with both a radial and a tangential component of direction in the direction shown by the arrows 84 at very high velocities equal to the peripheral speed of the impeller vane tip from which they are projected. Advantageously, the curvature of the impeller vanes 69 and 73 shown in FIGURE 2B throws the droplets therefrom in the direction shown by the arrows 86 and causes the tangential and radial velocities of the individual liquid droplets to be compounded, whereby relatively higher velocities of the droplets are achieved. The washing liquid is further accelerated into the direction of rotation of the individual impeller vanes 69 and 73.

The angle "A" or "B" between a tangent 88 to the path of revolution of the outer end of each vane and the direction 84 or 86 each vane 67, 69, 72 and 73 throws droplets is determined by the curvature and the angular velocity of the outer end of the vane and the outward velocity 80 or 82 of the liquid. It will be noted that the forwardly curving vanes 69 and 73 provide a component of forward velocity as indicated by the arrows 82, which is added to the rotational velocity of the vanes. Thus, the final speed of the droplets emanating from these vanes is desirably increased and the droplets are projected in a more forwardly direction so that the angle B is less than the angle A. Accordingly, those droplets are impelled from the curving vanes at different angles and, also, at greater velocities than those impelled from the radial vanes 67 and 72. Therefore, the droplets leaving impeller vanes 69 and 73 overlap the droplets leaving the vanes 67 and 72 at different angles and speeds, and the possibility of voids within the spray pattern is very substantially eliminated so that a more uniform coverage of the volume of treated gas is obtained.

In order to provide a uniform distribution about the periphery of the spray-generating units 11, 13 and 15, the feed device housings 29, 31 and 33 of FIGURE 1 and also, the feed device housing 43 of FIGURE 1A, if employed, are adapted to direct washing fluid with a circular flow component 90 to the respective units 11, 13 and 15 corresponding with the direction of rotation of these units.

Figure 4A:
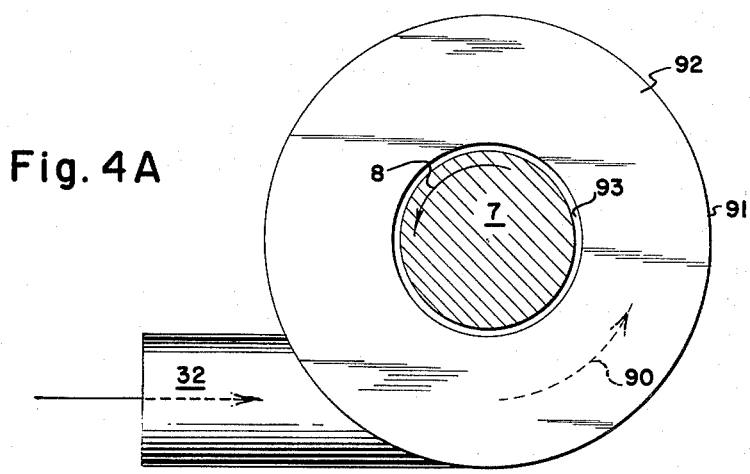
FIGURES 4A and 4B illustrate a top and a side view, partially in section, of a feed device housing for supplying washing fluid to the respective faces of the support plates.
Figure 4B:
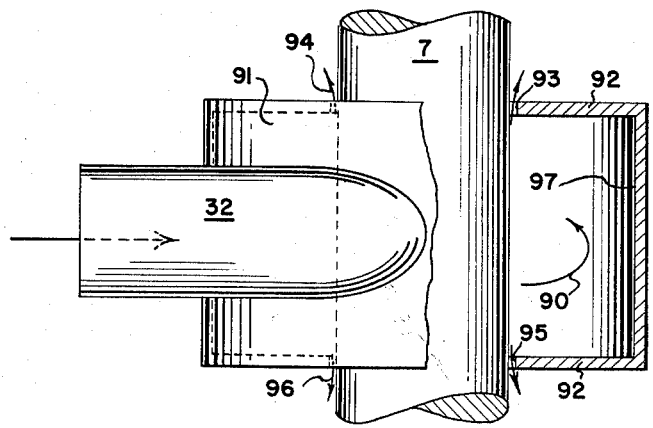

FIGURES 4A and 4B are enlarged views of the annular jet feed device 31 shown in FIGURE 1. This device forms an annular chamber around the shaft 7, but with clearance at the center to provide annular discharge orifices 93 and 95 to control the distribution of the washing liquid and maintain pressure in the annular chamber 31 thus causing the liquid to be discharged both top and bottom in a forceful conical jet against the vaned faces of the discs 11–15, as indicated by the arrows 94 and 96 aimed toward the tapered inner ends of the vanes 67 and 69. In order to confine the liquid under pressure in the housing so as to provide the conical jets 94 and 96 the total cross-sectional area of the annular discharge orifices 93, 95 is no greater, and advantageously less, than half the cross-sectional area of the supply pipe 32.

As illustrated, the supply pipe 32 directs washing liquid under pressure into the feed device housing 31 at an angle substantially tangential to the inner wall 97 and in the direction of rotation of the shaft 7, as indicated by the arrows 8 and 90. Accordingly, the washing fluid is deflected along the curved inner wall 97 of the feed device housing 31 and acquires a circular flow component within the housing corresponding with the rotation of the shaft 7. Due to the rotational flow component, the washing fluid passes concurrently through the vents 93 and 95, i.e. upwardly and downwardly, and is equally distributed about the periphery of the rotating shaft 7 on the juxtaposed faces of the units 11 and 13, for example, as shown in FIGURE 1. A differential in the diameters of the vents 93 and 95 can be provided to control the proportion of the washing liquid being fed to these juxtaposed faces, but in most applications these vents are of the same diameter. When a feed device housing, e.g. the feed device housings 29 and 43 of FIGURES 1 and 1A, respectively, is employed to feed washing fluid only to the surface of a single spray-generating unit, e.g. the upper face of the unit 11 or the lower face of the unit 15, then the vents 95 and 93, respectively, are sealed. For example, the feed device housing may be provided with an inner sleeve disposed, with close clearance, about the shaft 7, so as to close up the vent on the opposite side from which the washing liquid is to be discharged.

Further, this invention is not intended to be limited to the illustrative embodiments as hereinabove described as it will be apparent that many refinements will occur to one skilled in the art without departing from the spirit and scope thereof.

I claim:

1. A multiple disk centrifugal gas washer which comprises a central shaft, a plurality of substantially flat spaced disks affixed to said shaft with top and bottom surfaces substantially normal to the axis of the shaft, means for rotating the shaft at high speed, a housing surrounding the shaft and disks but spaced therefrom to define a path for flow of the gas over the peripheral edges of said disks, means for flowing gas into said housing, along said path and out of the housing, means for supplying wash liquid to the top and bottom surfaces of said disks, generally radially directed vane means on each of said surfaces of said disks extending from near said shaft to adjacent the peripheries of said disks and differing in form between certain of said surfaces for breaking up the liquid into droplets and for accelerating and slinging said droplets from said disks substantially in the plane thereof at sufficiently high speeds to cause nearly all said droplets to traverse said flow of gas and to reach said housing.

2. A gas washer as defined in claim 1 in which said disk surfaces have vanes angularly spaced farther apart near the outer edge of the disk than near the center, and the faces of said vanes are substantially normal to the surfaces of said disks.

3. A gas washer as defined in claim 2 in which shorter vanes are positioned between and spaced from longer vanes, the ends of said shorter vanes adjacent the axis of the shaft being at a greater radius from the axis than the corresponding ends of said longer vanes and sharp, whereby to divide liquid flowing outward between said longer vanes.

4. A gas washer as defined in claim 3 in which said vanes are of three different lengths.

5. A gas washer as defined in claim 1 in which the shaft rotates at very high speed and is mounted in bearing means within the housing which are located above the disks.

6. A gas washer as defined in claim 1 in which said means on the surfaces of the disks are vanes which extend at an angle obliquely to the radius of said disks.

7. A gas washer as defined in claim 1 in which said means on the surfaces of the disks are vanes which are curved toward the direction of rotation from substantially radial near said shaft to substantially canted at the periphery of said disks.

8. A gas washer as defined in claim 6 wherein the angle to the radius at which the vanes on each disk surface are set is different from the corresponding angle on other disk surfaces.

References Cited in the file of this patent

UNITED STATES PATENTS

| | | |
|---|---|---|
| 1,095,835 | Fiddes | May 5, 1914 |
| 1,528,204 | Greenawalt | Mar. 3, 1925 |
| 1,856,120 | Valentine | May 3, 1932 |
| 1,973,051 | Doolittle | Sept. 11, 1934 |
| 1,992,762 | Pease | Feb. 25, 1935 |
| 2,220,275 | Preston | Nov. 5, 1940 |
| 2,268,219 | Lyons et al. | Dec. 30, 1941 |
| 2,539,344 | Carraway | Jan. 23, 1951 |
| 2,721,623 | Fletcher et al. | Oct. 25, 1955 |
| 2,789,866 | Umbricht | Apr. 23, 1957 |
| 2,815,246 | Nyrop | Dec. 3, 1957 |
| 2,889,005 | Umbricht | June 2, 1959 |

FOREIGN PATENTS

| | | |
|---|---|---|
| 622,123 | Germany | Nov. 21, 1935 |